(12) United States Patent
Yang (10) Patent No.: US 11,650,451 B2
(45) Date of Patent: May 16, 2023

(54) COLOR FILTER SUBSTRATE, MANUFACTURING METHOD THEREOF, AND DISPLAY DEVICE

(71) Applicants: HKC Corporation Limited, Guangdong (CN); Chongqing HKC Optoelectronics Technology Co., Ltd., Chongqing (CN)

(72) Inventor: Yanna Yang, Chongqing (CN)

(73) Assignees: HKC Corporation Limited, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 17/288,783

(22) PCT Filed: May 6, 2020

(86) PCT No.: PCT/CN2020/088803
§ 371 (c)(1),
(2) Date: Apr. 26, 2021

(87) PCT Pub. No.: WO2020/224598
PCT Pub. Date: Nov. 12, 2020

(65) Prior Publication Data
US 2022/0011629 A1 Jan. 13, 2022

(30) Foreign Application Priority Data

May 6, 2019 (CN) .......................... 201910370200.9

(51) Int. Cl.
*G02F 1/1335* (2006.01)
*G02F 1/1339* (2006.01)

(52) U.S. Cl.
CPC .... *G02F 1/133516* (2013.01); *G02F 1/13394* (2013.01); *G02F 1/13396* (2021.01); *G02F 1/133512* (2013.01)

(58) Field of Classification Search
CPC ......... G02F 1/133516; G02F 1/133514; G02F 1/133512; G02F 2201/121; G02B 5/22; G02B 5/223
See application file for complete search history.

(56) References Cited

U.S. PATENT DOCUMENTS 9,256,012 B2    2/2016  Li et al.
2006/0139274 A1*  6/2006  Song ..................... G02F 1/1395
                                                              345/90

(Continued)

FOREIGN PATENT DOCUMENTS

CN    103268037 A    8/2013
CN    104977749 A    10/2015

(Continued)

OTHER PUBLICATIONS

International Search Report for Application No. PCT/CN2020/088803 dated Aug. 12, 2020, 6 pages.

(Continued)

*Primary Examiner* — Angela K Davison
(74) *Attorney, Agent, or Firm* — Hauptman Ham, LLP (57) ABSTRACT

A color filter substrate includes: a base substrate; a black matrix arranged on a surface of the base substrate and defining a plurality of first light-transmitting regions a plurality of second light-transmitting regions and a plurality of third light-transmitting regions on the base substrate; a color resist layer including a first color resist, a second color resist and a third color resist arranged in the first light-transmitting regions, the second light-transmitting regions and the third light-transmitting regions respectively, the first color resist covering the black matrix between two adjacent (Continued)

first light-transmitting regions, and the second color resist covering the black matrix between two adjacent second light-transmitting regions; and a common electrode layer.

16 Claims, 4 Drawing Sheets

(56) References Cited

U.S. PATENT DOCUMENTS

| | | | | |
|---|---|---|---|---|
| 2014/0347614 A1* | 11/2014 | Asada | ................ | G02F 1/133707 |
| | | | | 349/123 |
| 2017/0168340 A1* | 6/2017 | Dong | ................ | G02F 1/133512 |
| 2018/0120656 A1* | 5/2018 | Okada | ................ | G02F 1/133514 |
| 2020/0209681 A1* | 7/2020 | Wang | ................ | G02F 1/133553 |

FOREIGN PATENT DOCUMENTS

| | | | |
|---|---|---|---|
| CN | 109445175 | A | 3/2019 |
| CN | 109459882 | A | 3/2019 |
| CN | 109491151 | A | 3/2019 |
| CN | 110221473 | A | 9/2019 |
| EP | 2738595 | A4 | 5/2015 |
| KR | 20080112599 | A | 12/2008 |
| KR | 20180069563 | A | 6/2018 |
| KR | 20180078926 | A | 7/2018 |

OTHER PUBLICATIONS

Chinese Office Action for Application No. 201910370200.9 dated Feb. 9, 2021, 9 pages.

* cited by examiner

Figure 6

COLOR FILTER SUBSTRATE, MANUFACTURING METHOD THEREOF, AND DISPLAY DEVICE

CROSS REFERENCE TO RELATED APPLICATIONS

This is a U.S. National Stage application of, and claims priority to, PCT/CN2020/088803, filed May 6, 2020, which further claims priority to Chinese Patent Application No. 201910370200.9, filed May 6, 2019, the disclosures of which are incorporated herein by reference in their entirety.

TECHNICAL FIELD

The present disclosure relates to the field of display technologies, more particularly, to a color filter substrate, a manufacturing method thereof and a display device.

BACKGROUND

A Liquid Crystal Display (LCD) is one of the most widely used displays at present. The LCD includes a pair of substrates provided with a field generating electrode such as a pixel electrode and a common electrode and a liquid crystal layer arranged between the two substrates. When a voltage is applied to the field generating electrode to generate an electric field in the liquid crystal layer, liquid crystal molecules are deflected under the action of the electric field, thus controlling the transmission of light to make the LCD display an image. An LCD device is provided with a red (R) pixel unit, a green (G) pixel unit and a blue (B) pixel unit. Under the same driving voltage, the light transmittance of the B pixel unit is lower than the light transmittance of the R pixel unit and the light transmittance of the G pixel unit, resulting in larger R and G color mixed brightness and a yellowish display screen.

SUMMARY

A color filter substrate includes:
a substrate;
a black matrix arranged on a surface of the substrate and defining a plurality of first light-transmitting regions, a plurality of second light-transmitting regions and a plurality of third light-transmitting regions on the substrate;
a color resist layer including a first color resist, a second color resist and a third color resist arranged in the first light-transmitting regions, the second light-transmitting regions and the third light-transmitting regions respectively, the first color resist covering the black matrix between two adjacent first light-transmitting regions, the second color resist covering the black matrix between two adjacent second light-transmitting regions, and the third color resist in two adjacent third light-transmitting regions being separated by the black matrix, wherein a light transmittance of the third color resist is less than a light transmittance of the first color resist and a light transmittance of the second color resist; and
a common electrode layer arranged on one side of the color resist layer facing away from the black matrix.

A manufacturing method of a color filter substrate includes:
forming a black matrix on a substrate, the black matrix defining a plurality of first light-transmitting regions, a plurality of second light-transmitting regions and a plurality of third light-transmitting regions on the substrate;
forming a color resist layer on the substrate where the black matrix is formed, the color resist layer including a first color resist, a second color resist and a third color resist arranged in the first light-transmitting regions, the second light-transmitting regions and the third light-transmitting regions respectively, the first color resist covering the black matrix between two adjacent first light-transmitting regions, the second color resist covering the black matrix between two adjacent second light-transmitting regions, and the third color resist in two adjacent third light-transmitting regions being separated by the black matrix, wherein a light transmittance of the third color resist is less than a light transmittance of the first color resist and a light transmittance of the second color resist; and
forming a common electrode layer on the substrate where the color resist layer is formed.

A display device includes a color filter substrate and an array substrate arranged oppositely, and a liquid crystal layer arranged between the color filter substrate and the array substrate, wherein the color filter substrate includes:
a substrate;
a black matrix arranged on a surface of the substrate and defining a plurality of first light-transmitting regions, a plurality of second light-transmitting regions and a plurality of third light-transmitting regions on the substrate;
a color resist layer including a first color resist, a second color resist and a third color resist arranged in the first light-transmitting regions, the second light-transmitting regions and the third light-transmitting regions respectively, the first color resist covering the black matrix between two adjacent first light-transmitting regions, the second color resist covering the black matrix between two adjacent second light-transmitting regions, and the third color resist in two adjacent third light-transmitting regions being separated by the black matrix, wherein a light transmittance of the third color resist is less than a light transmittance of the first color resist and a light transmittance of the second color resist; and
a common electrode layer arranged on one side of the color resist layer facing away from the black matrix.

BRIEF DESCRIPTION OF THE DRAWINGS

In order to more clearly illustrate the technical solutions in embodiments of the present disclosure, the accompanying drawings needing to be used in the description of the embodiments will be briefly introduced below. It is appreciated that, the accompanying drawings in the following description are only some embodiments of the present disclosure, and other drawings can be obtained by those of ordinary skill in the art from the provided drawings without creative work.

DETAILED DESCRIPTION OF THE EMBODIMENTS

In order to make the objectives, technical solutions and advantages of the present disclosure clearer, the present disclosure is described in further detail below with reference to the drawings and embodiments. It should be understood that specific embodiments described herein are intended to interpret the present disclosure but not to limit the present disclosure.

The present disclosure provides a color filter substrate. Referring to FIG. 1, FIG. 2, FIG. 3 and FIG. 4, the color filter substrate includes a substrate 100, a black matrix 200, a color resist layer 300 and a common electrode layer 400.

The black matrix 200 is arranged on a surface of the substrate 100 and defines a plurality of first light-transmitting regions 202, a plurality of second light-transmitting regions 204 and a plurality of third light-transmitting regions 206 on the substrate 100.

It may be understood that a material for forming the black matrix 200 is coated on the substrate 100, and light-transmitting regions and non-light-transmitting regions arranged at intervals are defined through a patterning process, wherein the non-light-transmitting regions are regions of the black matrix 200 and are used for preventing light crosstalk between pixels.

The color resist layer 300 includes a first color resist 310, a second color resist 320 and a third color resist 330. The first color resist 310, the second color resist 320 and the third color resist 330 are arranged in the first light-transmitting regions 202, the second light-transmitting regions 204 and the third light-transmitting regions 206 respectively, the first color resist 310 covers the black matrix 200 between two adjacent first light-transmitting regions, the second color resist 320 covers the black matrix 200 between two adjacent second light-transmitting regions, and the third color resist 330 in two adjacent third light-transmitting regions is separated by the black matrix 200. The light transmittance of the third color resist 330 is less than the light transmittance of the first color resist 310 and the light transmittance of the second color resist 320.

Figure 1:
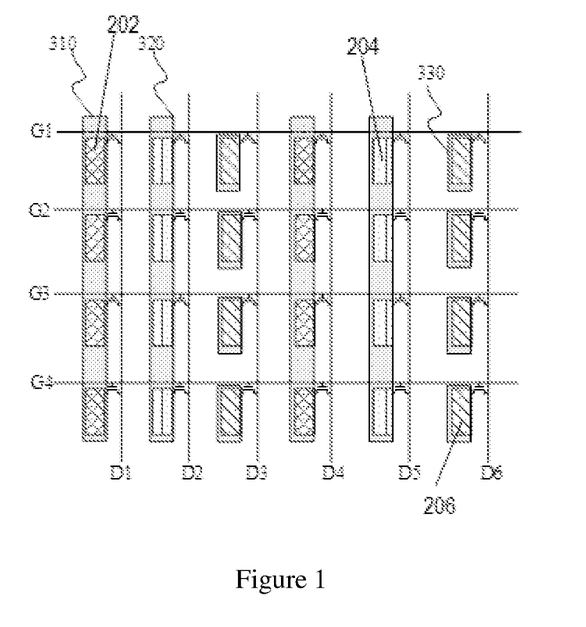
FIG. 1 is a top view of a color filter substrate according to an embodiment of the present disclosure.
Figure 3:
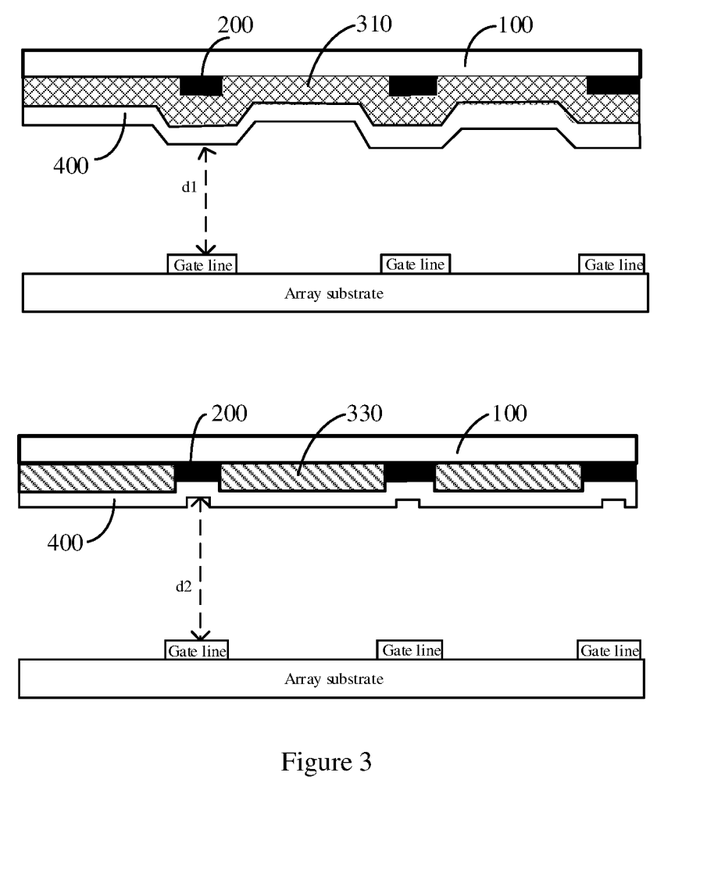
FIG. 3 is a schematic diagram of a distance between a common electrode layer between two adjacent first light-transmitting regions and a gate line of an array substrate and a distance between a common electrode layer between two adjacent third light-transmitting regions and the gate line of the array substrate according to an embodiment of the present disclosure.

In the color filter substrate shown in FIG. 1, the plurality of first light-transmitting regions 202 are arranged in a sequence to form a shape of a strip along an extension direction parallel to a data line in an array substrate, and the plurality of second light-transmitting regions 204 and the plurality of third light-transmitting regions 206 are both arranged in the same manner. Since the first color resist 310 covers the black matrix 200 between two adjacent first light-transmitting regions, the second color resist 320 covers the black matrix 200 between two adjacent second light-transmitting regions, and the third color resist 330 in two adjacent third light-transmitting regions is separated by the black matrix 200, that is, the third color resist 330 does not cover the black matrix 200 between two adjacent third light-transmitting regions, a distance d2 between the common electrode layer between the two adjacent third light-transmitting regions and a gate line in the array substrate increases, i.e., d1<d2, where d1 denotes a distance between the common electrode layer between the two adjacent first light-transmitting regions and the gate line in the array substrate. In other words, the parasitic capacitance between the gate line and the common electrode layer on the side of the color filter substrate decreases, and influences on an electric field between the color filter substrate and the array substrate are weakened, so that a charging rate of a capacitor formed by the common electrode layer on the side of the color filter substrate and the electrode on the side of the array substrate increases, which accelerates deflection of liquid crystal molecules in regions corresponding to the third light-transmitting regions, and then improves the light transmittance of the third light-transmitting regions and reduces differences of light transmittance between the light-transmitting regions, thereby achieving the purpose of improving color offset of a yellowish screen and improving the display quality.

Figure 4:
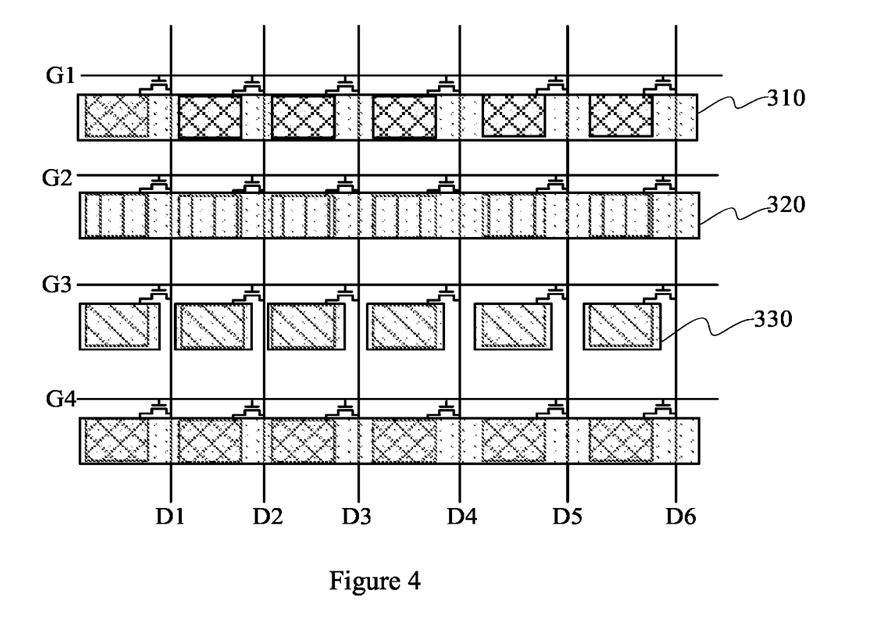
FIG. 4 is a top view of another color filter substrate according to an embodiment of the present disclosure.

In the color filter substrate shown in FIG. 4, the plurality of first light-transmitting regions are arranged in a sequence to form a shape of a strip along an extension direction parallel to a gate line in an array substrate, and the plurality of second light-transmitting regions and the plurality of third light-transmitting regions are both arranged in the same manner. Since the first color resist 310 covers the black matrix 200 between two adjacent first light-transmitting regions, the second color resist 320 covers the black matrix 200 between two adjacent second light-transmitting regions, and the third color resist 330 in two adjacent third light-transmitting regions is separated by the black matrix 200, a distance between the common electrode layer between the two adjacent third light-transmitting regions and a data line in the array substrate increases, the parasitic capacitance between the data line and the common electrode layer on the side of the color filter substrate decreases, and influences on an electric field between the color filter substrate and the array substrate are weakened, so that a charging rate of a capacitor formed by the common electrode layer on the side of the color filter substrate and the electrode on the side of the array substrate increases, which accelerates deflection of liquid crystal molecules in regions corresponding to the third light-transmitting regions, and then improves the light transmittance of the third light-transmitting regions and reduces differences of light transmittance between the light-transmitting regions, thereby achieving the purpose of improving color offset of a yellowish screen and improving the display quality.

Figure 2:
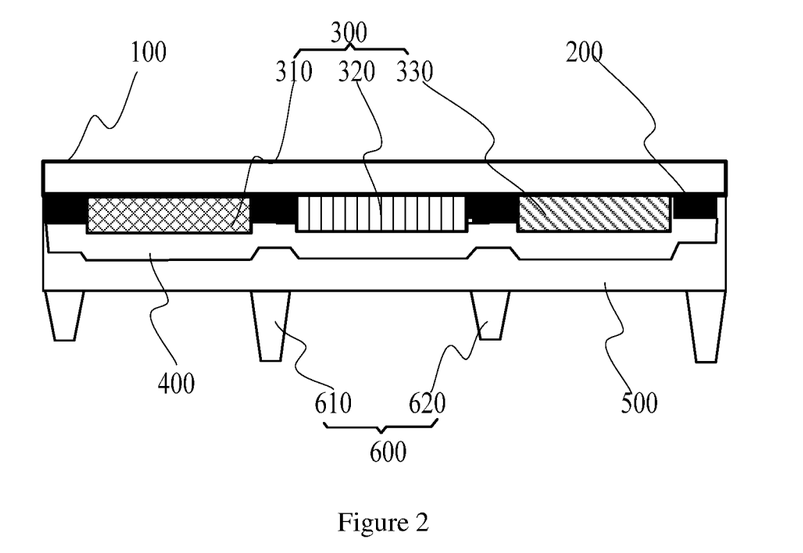
FIG. 2 is a schematic diagram of a sectional structure of a color filter substrate according to an embodiment of the present disclosure.

The common electrode layer 400 is arranged on one side of the color resist layer 300 facing away from the black matrix 200.

In one embodiment, the color filter substrate further includes a protection layer 500. The black matrix 200, the color resist layer 300, the common electrode layer 400 and the protection layer 500 are arranged on the same side of the substrate 100, and the protection layer 500 is arranged on one side of the common electrode layer 400 facing an array substrate. It may be understood that since part of the black matrix 200 is covered with the color resist layer 300, a height difference exists in the color filter substrate. In the present embodiment, the protection layer 500 is provided, so that a height difference between the black matrix 200 and the color resist layer 300 can be filled, and the flatness of the color filter substrate can be increased to avoid uneven display.

In one embodiment, the color filter substrate further includes a spacer 600. The spacer 600 is arranged on one side of the protection layer 500 facing the array substrate. Specifically, the spacer 600 is provided with a projection region of the black matrix 200 on the protection layer 500. It may be understood that after the color filter substrate and the array substrate are cell-aligned, they can be supported by using the spacer 600 if subject to an external pressure, so as to improve the yield of a display panel.

In one embodiment, the spacer 600 includes a primary spacer 610 and a secondary spacer 620, wherein a height of the primary spacer 610 is greater than that of the secondary spacer 620, so that the array substrate can be supported at different heights through the primary spacer 610 and the secondary spacer 620, and the yield of the display panel can be further improved.

In one embodiment, the first color resist 310 is a red color resist, the second color resist 320 is a green color resist, and the third color resist 330 is a blue color resist.

Figure 5:
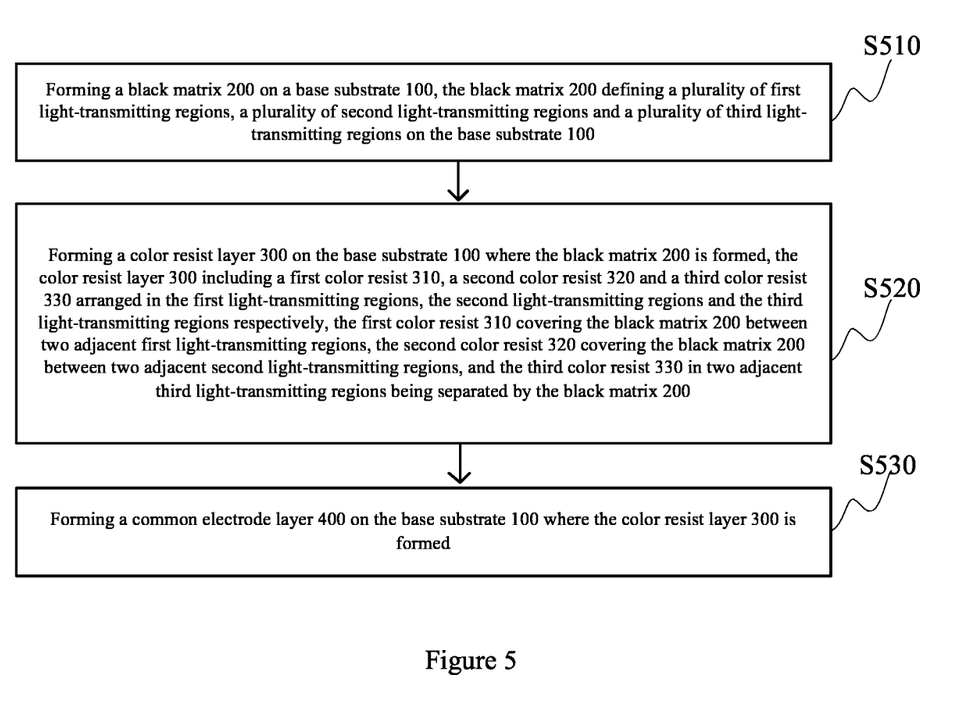
FIG. 5 is a schematic flow chart of a manufacturing method of a color filter substrate according to an embodiment of the present disclosure.

Based on the same invention concept, taking the color filter substrate shown in FIG. 1 as an example, an embodiment of the present disclosure further provides a manufacturing method of a color filter substrate. Referring to FIG. 5, the manufacturing method includes following steps.

In step S510, a black matrix 200 is formed on a substrate 100. The black matrix 200 defines a plurality of first light-transmitting regions, a plurality of second light-transmitting regions and a plurality of third light-transmitting regions on the substrate 100. A specific manufacturing process includes coating, mask exposure and development, and so on. Steps in the process are prior arts and are not described in detail.

In step S520, a color resist layer 300 is formed on the substrate 100 where the black matrix 200 is formed, the color resist layer 300 including a first color resist 310, a second color resist 320 and a third color resist 330. The first color resist 310, the second color resist 320 and the third color resist 330 are arranged in the first light-transmitting regions, the second light-transmitting regions and the third light-transmitting regions respectively, the first color resist 310 covers the black matrix 200 between two adjacent first light-transmitting regions, the second color resist 320 covers the black matrix 200 between two adjacent second light-transmitting regions, and the third color resist 330 in two adjacent third light-transmitting regions is separated by the black matrix 200, wherein the light transmittance of the third color resist 330 is less than the light transmittance of the first color resist 310 and the light transmittance of the second color resist 320. The specific manufacturing process includes coating a photoresist material, and then forming the first color resist 310, the second color resist 320 and the third color resist 330 again through mask exposure and development.

In step S530, a common electrode layer 400 is formed on the substrate 100 where the color resist layer 300 is formed. The specific manufacturing process includes depositing, through magnetron sputtering, an indium tin oxide (ITO) transparent conductive film on the substrate 100 where the color resist layer 300 is formed, and forming the common electrode layer 400 through wet etching and stripping after photoresist coating, exposure and development.

It may be understood that the third color resist 330 does not cover the black matrix 200 between two adjacent third light-transmitting regions, and a distance between the common electrode layer between the two adjacent third light-transmitting regions and a gate line in the array substrate increases. In other words, the parasitic capacitance between the gate line and the common electrode layer on the side of the color filter substrate decreases, and influences on an electric field between the color filter substrate and the array substrate are weakened, so that a charging rate of a capacitor formed by the common electrode layer on the side of the color filter substrate and the electrode on the side of the array substrate increases, which accelerates deflection of liquid crystal molecules in regions corresponding to the third light-transmitting regions, and then improves the light transmittance of the third light-transmitting regions and reduces differences of light transmittance between the light-transmitting regions, thereby achieving the purpose of improving color offset of a yellowish screen and improving the display quality.

In one embodiment, the forming a color resist layer 300 on the substrate 100 where the black matrix 200 is formed includes:

coating a first color resist 310 material, a second color resist 320 material and a third color resist 330 material on the substrate 100 where the black matrix 200 is formed; and etching away the third color resist 330 between the two adjacent third light-transmitting regions through an exposure development process.

Figure 6:
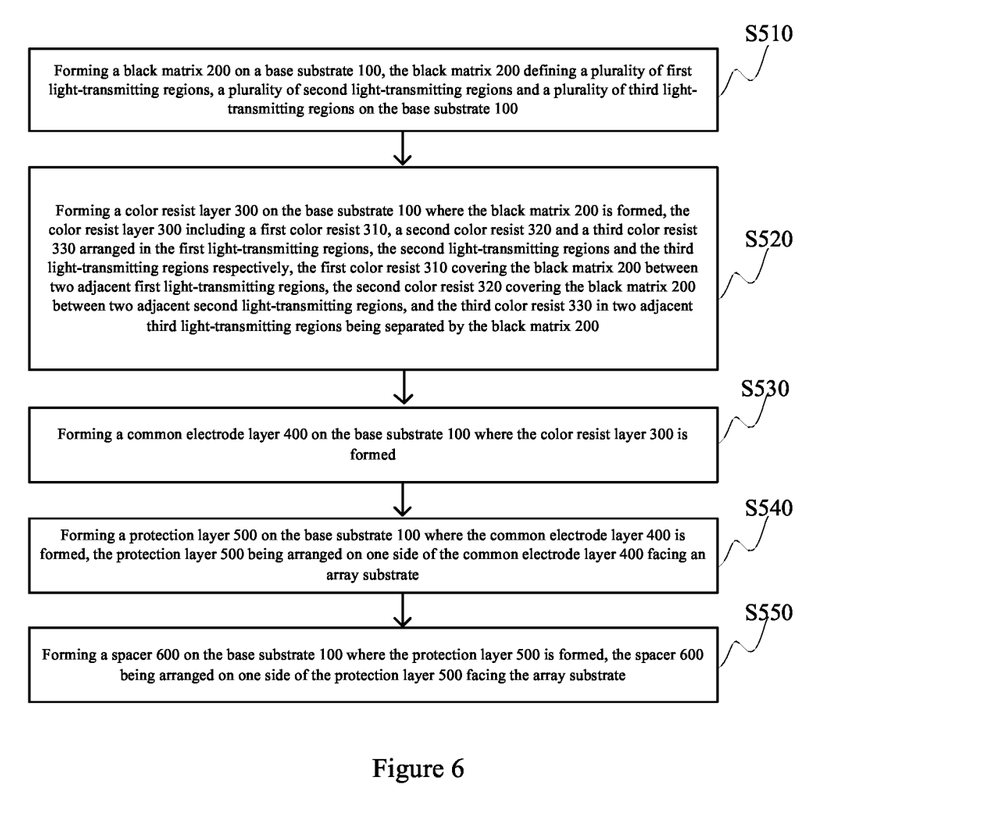
FIG. 6 is a schematic flow chart of another manufacturing method of a color filter substrate according to an embodiment of the present disclosure.

Referring to FIG. 6, in one embodiment, the manufacturing method of a color filter substrate further includes a following step.

In step S540, a protection layer 500 is formed on the substrate 100 where the common electrode layer 400 is formed. The protection layer 500 is arranged on one side of the common electrode layer 400 facing an array substrate. It may be understood that since part of the black matrix 200 is covered with the color resist layer 300, a height difference exists in the color filter substrate. In the present embodiment, the protection layer 500 is provided, so that a height difference between the black matrix 200 and the color resist layer 300 can be filled, and the flatness of the color filter substrate can be increased to avoid uneven display.

In one embodiment, the manufacturing method of a color filter substrate further includes a following step.

In step S550, a spacer 600 is formed on the substrate 100 where the protection layer 500 is formed. The spacer 600 is arranged on one side of the protection layer 500 facing the array substrate. It may be understood that after the color filter substrate and the array substrate are cell-aligned, they can be supported by using the spacer 600 if subject to an external pressure, so as to improve the yield of a display panel.

In one embodiment, the spacer 600 includes a primary spacer 610 and a secondary spacer 620, and a height of the primary spacer 610 is greater than that of the secondary spacer 620. In the present embodiment, the array substrate can be supported at different heights through the primary spacer 610 and the secondary spacer 620, and the yield of the display panel can be further improved.

It needs to be noted that the manufacturing method of a color filter substrate in FIG. 4 of the present disclosure is similar to the manufacturing method of a color filter substrate according to the above embodiment, and is not described in detail herein.

Based on the same invention concept, an embodiment of the present disclosure further provides a display device, including a color filter substrate and an array substrate arranged oppositely, and a liquid crystal layer arranged between the color filter substrate and the array substrate, and the color filter substrate is the color filter substrate according to any of the embodiments described above.

Based on the above, the embodiments of the present disclosure provide a color filter substrate, a manufacturing method thereof and a display device. The color filter substrate includes a substrate 100, a black matrix 200, a color resist layer 300 and a common electrode layer 400. The black matrix 200 is arranged on a surface of the substrate 100 and defines a plurality of first light-transmitting regions, a plurality of second light-transmitting regions and a plurality of third light-transmitting regions on the substrate 100. The color resist layer 300 includes a first color resist 310, a second color resist 320 and a third color resist 330. The first color resist 310, the second color resist 320 and the third color resist 330 are arranged in the first light-transmitting regions, the second light-transmitting regions and the third light-transmitting regions respectively, the first color resist 310 covers the black matrix 200 between two adjacent first light-transmitting regions, the second color resist 320 covers the black matrix 200 between two adjacent second light-transmitting regions, and the third color resist 330 in two adjacent third light-transmitting regions is separated by the black matrix 200. The light transmittance of the third color resist 330 is less than the light transmittance of the first color resist 310 and the light transmittance of the second color resist 320. The common electrode layer 400 is arranged on one side of the color resist layer 300 facing away from the black matrix 200. In the present disclosure, since the first color resist 310 covers the black matrix 200 between two adjacent first light-transmitting regions, the second color resist 320 covers the black matrix 200 between two adjacent second light-transmitting regions, and the third color resist 330 in two adjacent third light-transmitting regions is separated by the black matrix 200, that is, the third color resist 330 does not cover the black matrix 200 between two adjacent third light-transmitting regions, a distance between the common electrode layer between the two adjacent third light-transmitting regions and a gate line in the array substrate increases. In other words, the parasitic capacitance between the gate line and the common electrode layer on the side of the color filter substrate decreases, and influences on an electric field between the color filter substrate and the array substrate are weakened, so that a charging rate of a capacitor formed by the common electrode layer on the side of the color filter substrate and the electrode on the side of the array substrate increases, which accelerates deflection of liquid crystal molecules in regions corresponding to the third light-transmitting regions, and then improves the light transmittance of the third light-transmitting regions and reduces differences of light transmittance between the light-transmitting regions, thereby achieving the purpose of improving color offset of a yellowish screen and improving the display quality.

The technical features of the above embodiments may be arbitrarily combined. For the sake of brevity, all possible combinations of the technical features in the above embodiments are not described. However, if there is no contradiction in the combinations of the technical features, the combinations shall be considered to be within the scope of the specification.

The above embodiments represent only several implementations of the present disclosure, which are described more specifically and in detail, but are not to be construed as limiting the scope of the present disclosure. It should be noted that, for those of ordinary skill in the art, a number of transformations and improvements can also be made without departing from the conception of the present disclosure, and all these transformations and improvements fall within the protection scope of the present disclosure. Therefore, the protection scope of the present disclosure shall be subject to the appended claims.

The invention claimed is:

1. A color filter substrate, comprising:
   a substrate;
   a black matrix arranged on a surface of the substrate and defining a plurality of first light-transmitting regions, a plurality of second light-transmitting regions and a plurality of third light-transmitting regions on the substrate;
   a color resist layer comprising a first color resist, a second color resist and a third color resist arranged in the first light-transmitting regions, the second light-transmitting regions and the third light-transmitting regions respectively, the first color resist covering the black matrix between any two adjacent first light-transmitting regions, the second color resist covering the black matrix between any two adjacent second light-transmitting regions, and the third color resist in two adjacent third light-transmitting regions being separated by the black matrix, wherein a light transmittance of the third color resist is less than a light transmittance of the first color resist and a light transmittance of the second color resist; and
   a common electrode layer arranged on one side of the color resist layer facing away from the black matrix, wherein
   a distance between the common electrode layer between any two adjacent first light-transmitting regions and a gate line in the array substrate is less than a distance between the common electrode layer between any two adjacent third light-transmitting regions and the gate line in the array substrate.

2. The color filter substrate according to claim 1, wherein the plurality of first light-transmitting regions are arranged in a sequence to form a shape of a strip along an extension direction parallel to a data line in an array substrate, and the plurality of second light-transmitting regions and the plurality of third light-transmitting regions are both arranged in the same manner, wherein the array substrate is another substrate arranged opposite the color filter substrate for cell alignment.

3. The color filter substrate according to claim 1, wherein the first color resist is a red color resist, the second color resist is a green color resist, and the third color resist is a blue color resist.

4. The color filter substrate according to claim 1, further comprising a protection layer, the black matrix, the color resist layer, the common electrode layer and the protection layer being arranged on the same side of the substrate, and the protection layer being arranged on one side of the common electrode layer facing an array substrate.

5. The color filter substrate according to claim 4, further comprising a spacer arranged on one side of the protection layer facing the array substrate.

6. The color filter substrate according to claim 5, wherein the spacer is provided with a projection region of the black matrix on the protection layer.

7. The color filter substrate according to claim 5, wherein the spacer comprises a primary spacer and a secondary spacer, wherein a height of the primary spacer is greater than that of the secondary spacer.

8. A manufacturing method of a color filter substrate, comprising:
   forming a black matrix on a substrate, the black matrix defining a plurality of first light-transmitting regions, a plurality of second light-transmitting regions and a plurality of third light-transmitting regions on the substrate;
   forming a color resist layer on the substrate where the black matrix is formed, the color resist layer comprising a first color resist, a second color resist and a third color resist arranged in the first light-transmitting regions, the second light-transmitting regions and the third light-transmitting regions respectively, the first color resist covering the black matrix between any two adjacent first light-transmitting regions, the second color resist covering the black matrix between any two adjacent second light-transmitting regions, and the third color resist in two adjacent third light-transmitting regions being separated by the black matrix, wherein a light transmittance of the third color resist is less than a light transmittance of the first color resist and a light transmittance of the second color resist; and forming a common electrode layer on the substrate where the color resist layer is formed, wherein a distance between the common electrode layer between any two adjacent first light-transmitting regions and a gate line in the array substrate is less than a distance between the common electrode layer between any two adjacent third light-transmitting regions and the gate line in the array substrate.

9. The manufacturing method according to claim 8, wherein the forming a color resist layer on the substrate where the black matrix is formed comprises:

coating a first color resist material, a second color resist material and a third color resist material on the substrate where the black matrix is formed; and etching away the third color resist between the two adjacent third light-transmitting regions through an exposure development process.

10. The manufacturing method according to claim 8, wherein the forming a common electrode layer on the substrate where the color resist layer is formed comprises:

depositing, through magnetron sputtering, an indium tin oxide transparent conductive film on the substrate where the color resist layer is formed, and forming the common electrode layer through wet etching and stripping after photoresist coating, exposure and development.

11. The manufacturing method according to claim 8, further comprising: forming a protection layer on the substrate where the common electrode layer is formed, the protection layer being arranged on one side of the common electrode layer facing an array substrate.

12. The manufacturing method according to claim 11, further comprising: forming a spacer on the substrate where the protection layer is formed, the spacer being arranged on one side of the protection layer facing the array substrate.

13. The manufacturing method according to claim 12, wherein the spacer comprises a primary spacer and a secondary spacer, wherein a height of the primary spacer is greater than that of the secondary spacer.

14. A display device, comprising a color filter substrate and an array substrate arranged oppositely, and a liquid crystal layer arranged between the color filter substrate and the array substrate, wherein the color filter substrate comprises:

a substrate;

a black matrix arranged on a surface of the substrate and defining a plurality of first light-transmitting regions, a plurality of second light-transmitting regions and a plurality of third light-transmitting regions on the substrate;

a color resist layer comprising a first color resist, a second color resist and a third color resist arranged in the first light-transmitting regions, the second light-transmitting regions and the third light-transmitting regions respectively, the first color resist covering the black matrix between any two adjacent first light-transmitting regions, the second color resist covering the black matrix between any two adjacent second light-transmitting regions, and the third color resist in two adjacent third light-transmitting regions being separated by the black matrix, wherein a light transmittance of the third color resist is less than a light transmittance of the first color resist and a light transmittance of the second color resist; and a common electrode layer arranged on one side of the color resist layer facing away from the black matrix, wherein a distance between the common electrode layer between any two adjacent first light-transmitting regions and a gate line in the array substrate is less than a distance between the common electrode layer between any two adjacent third light-transmitting regions and the gate line in the array substrate.

15. The display device according to claim 14, wherein the color filter substrate further comprises a protection layer, the black matrix, the color resist layer, the common electrode layer and the protection layer are arranged on the same side of the substrate, and the protection layer is arranged on one side of the common electrode layer facing an array substrate.

16. The display device according to claim 14, wherein the first color resist is a red color resist, the second color resist is a green color resist, and the third color resist is a blue color resist.

* * * * *